A. COTOLI.
MACHINE FOR FORMING PLASTIC MATERIALS INTO TWISTED SHAPES.
APPLICATION FILED AUG. 16, 1910.
1,004,376.
Patented Sept. 26, 1911.
10 SHEETS—SHEET 2.
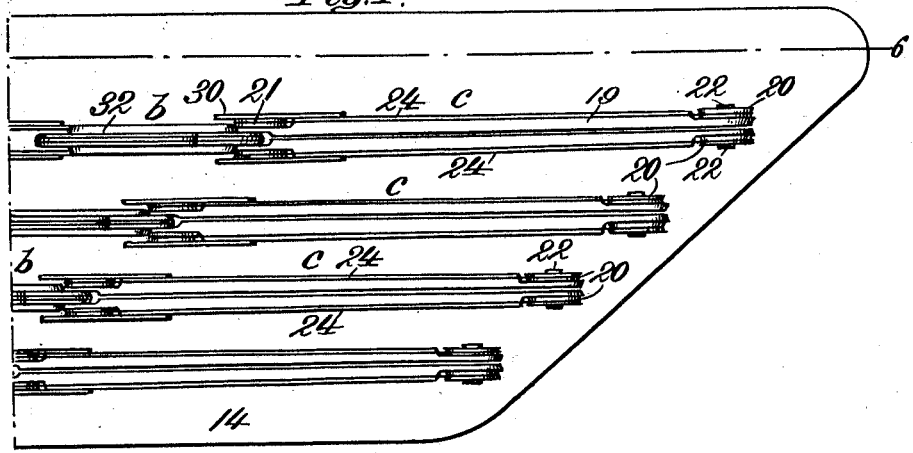
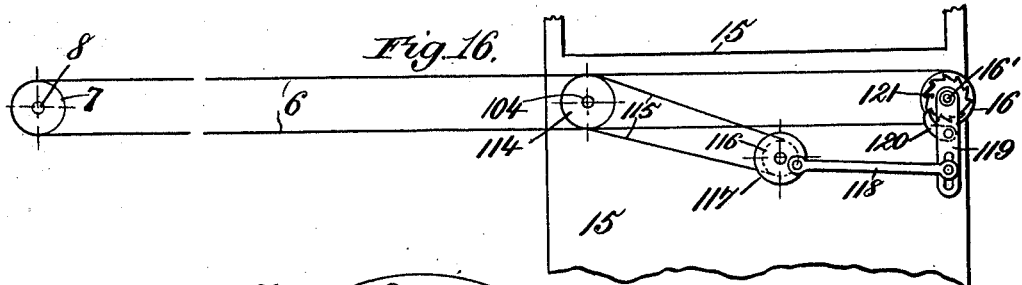
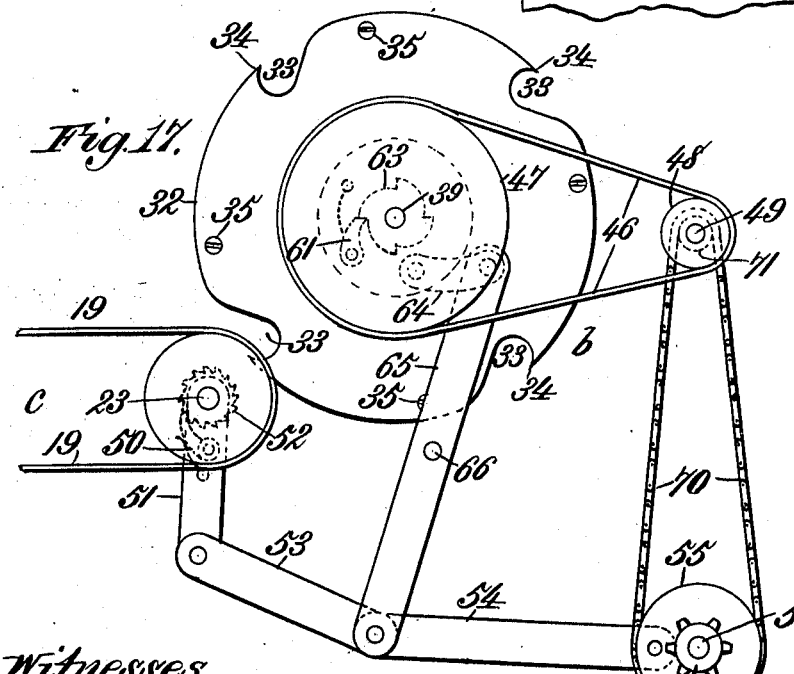
Witnesses.
Inventor:
Antonio Cotoli.
By James L. Norris, Atty.

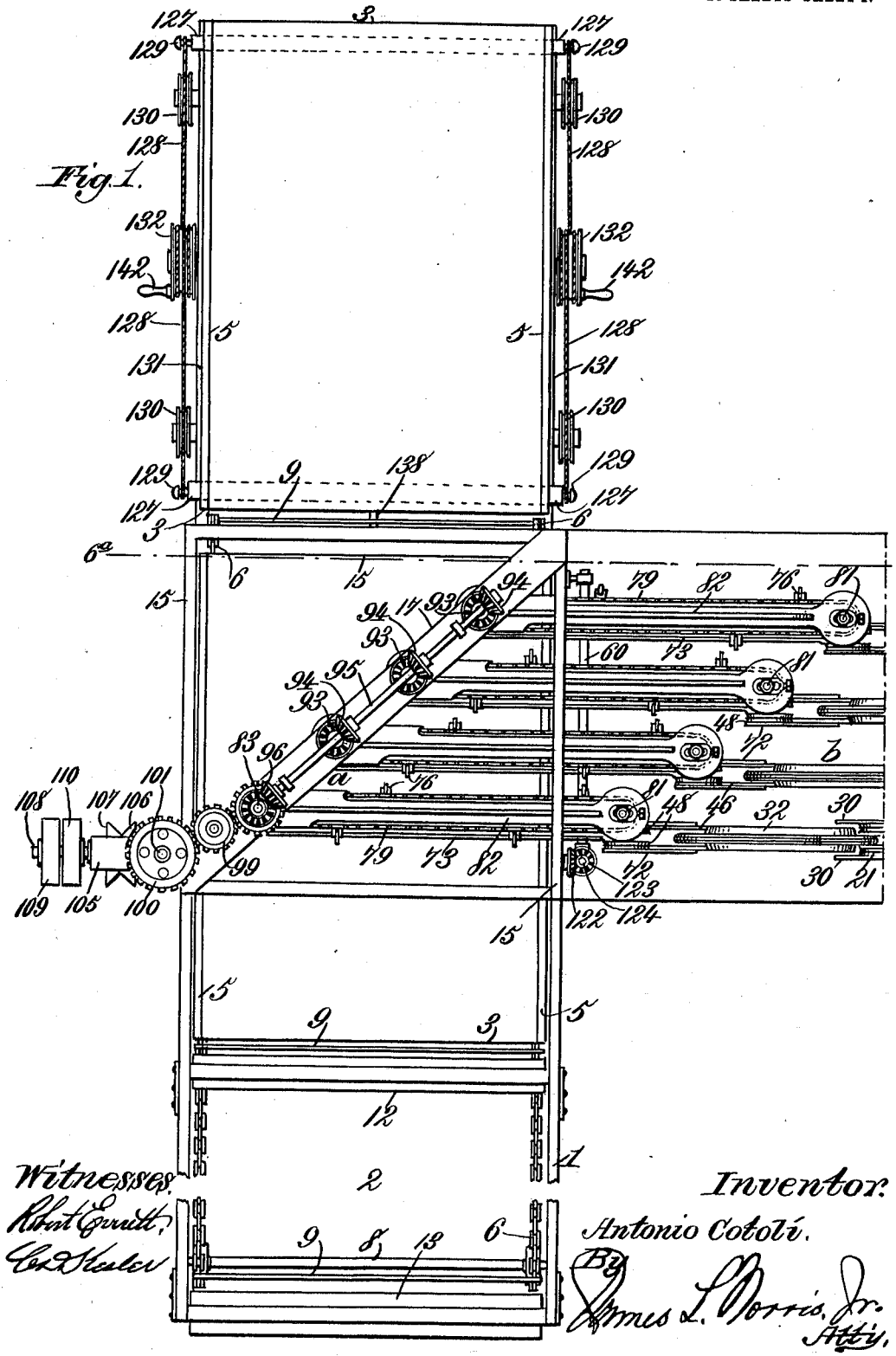

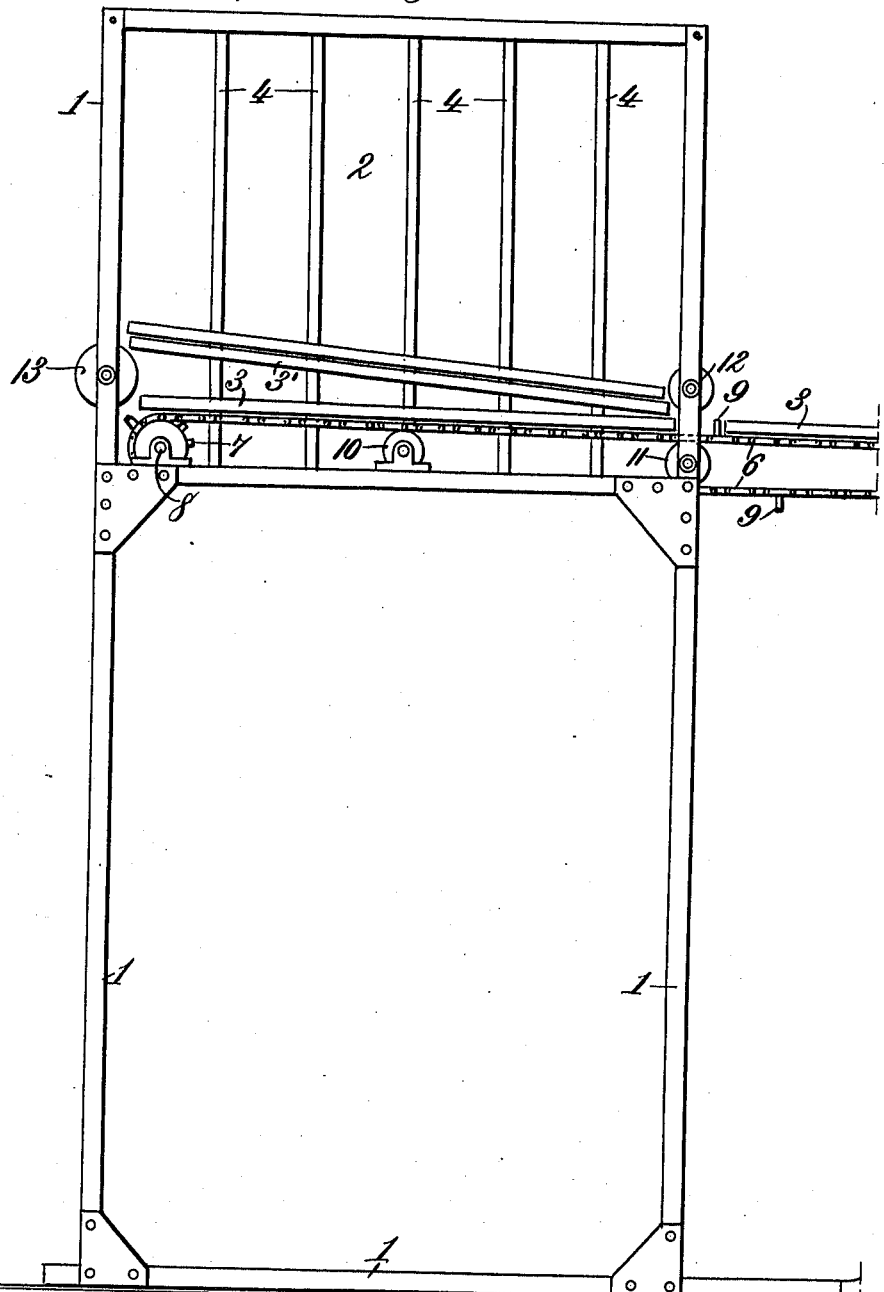

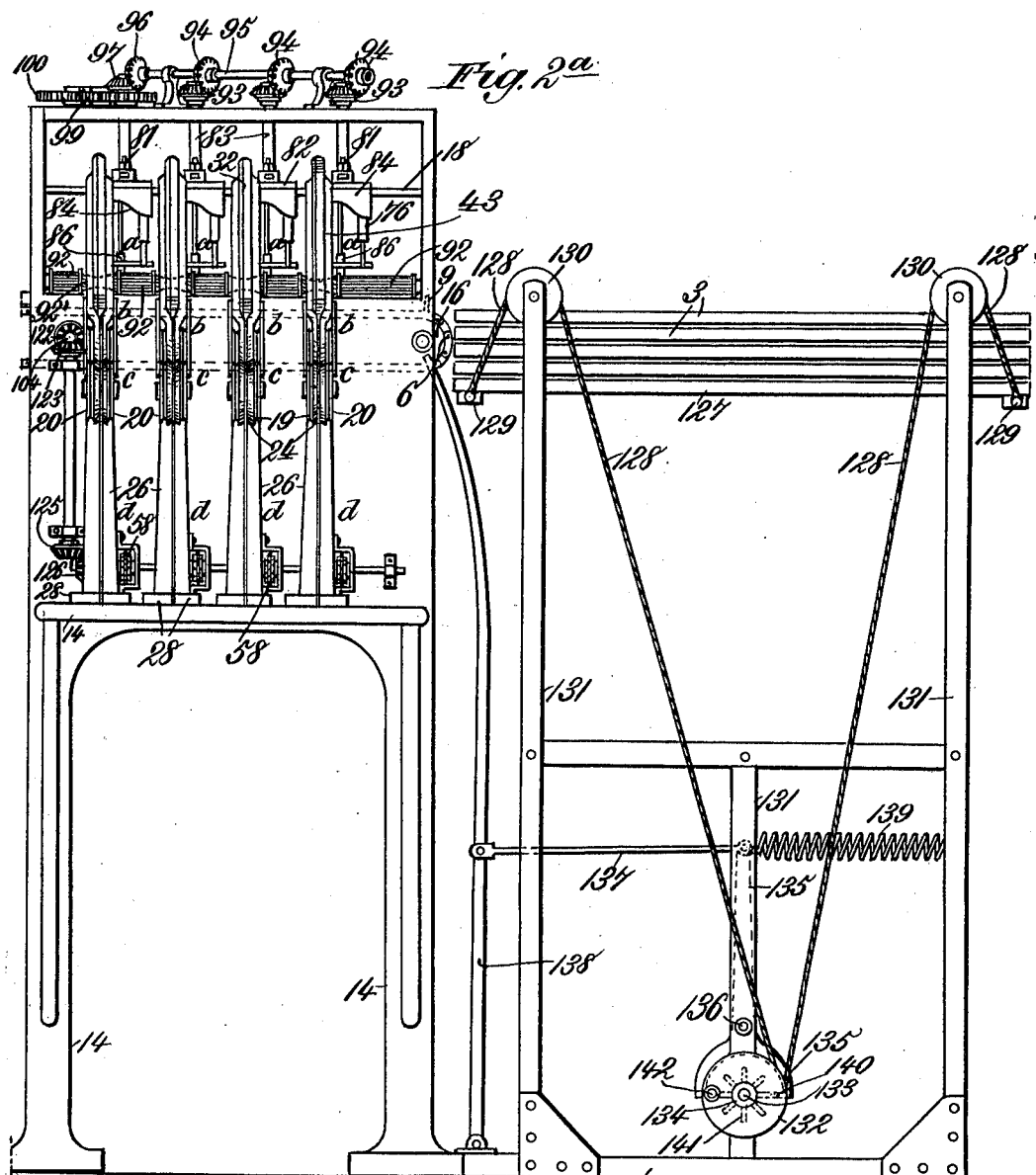

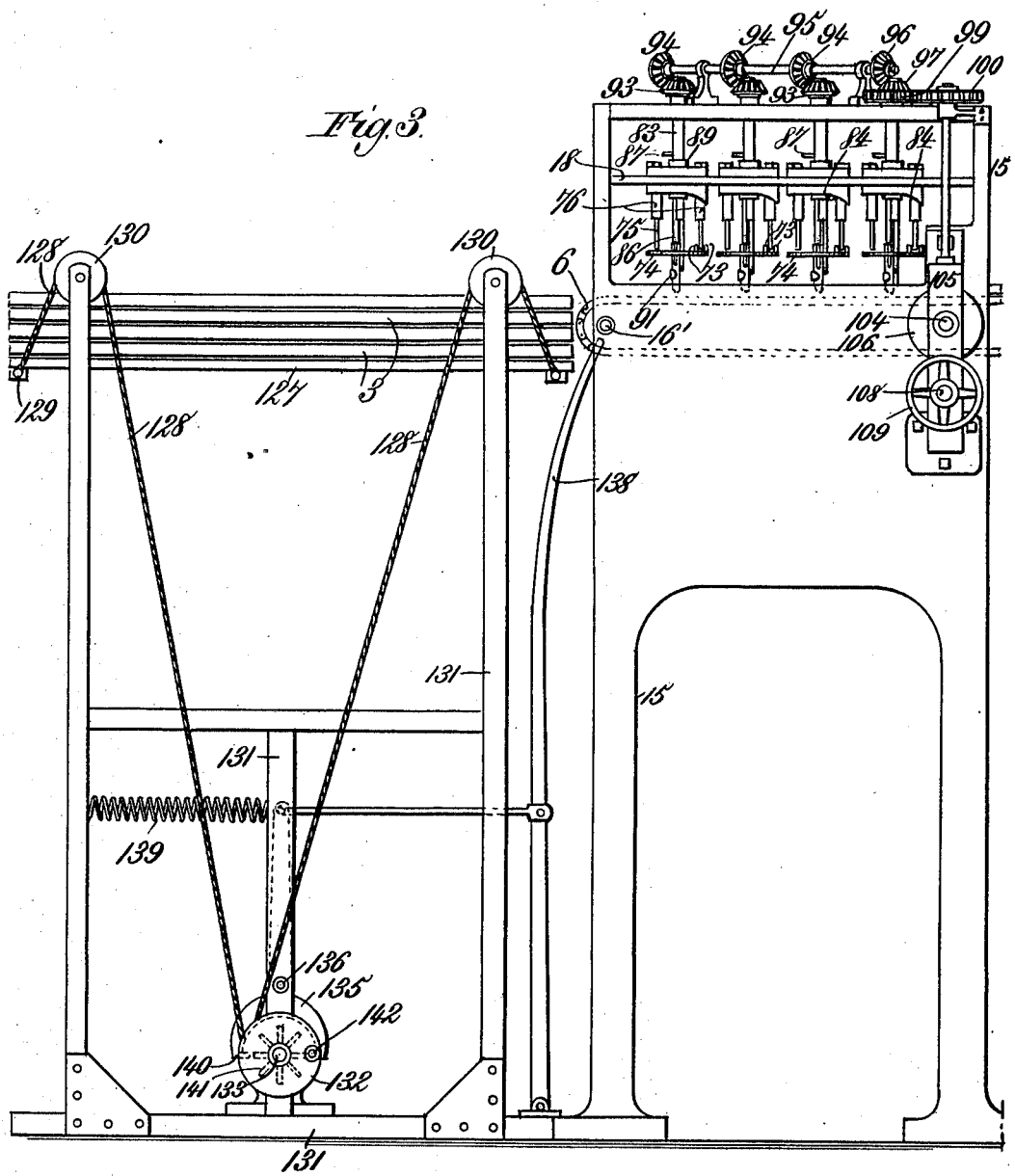

A. COTOLI.
MACHINE FOR FORMING PLASTIC MATERIALS INTO TWISTED SHAPES.
APPLICATION FILED AUG. 16, 1910.
1,004,376.
Patented Sept. 26, 1911.
10 SHEETS—SHEET 6.
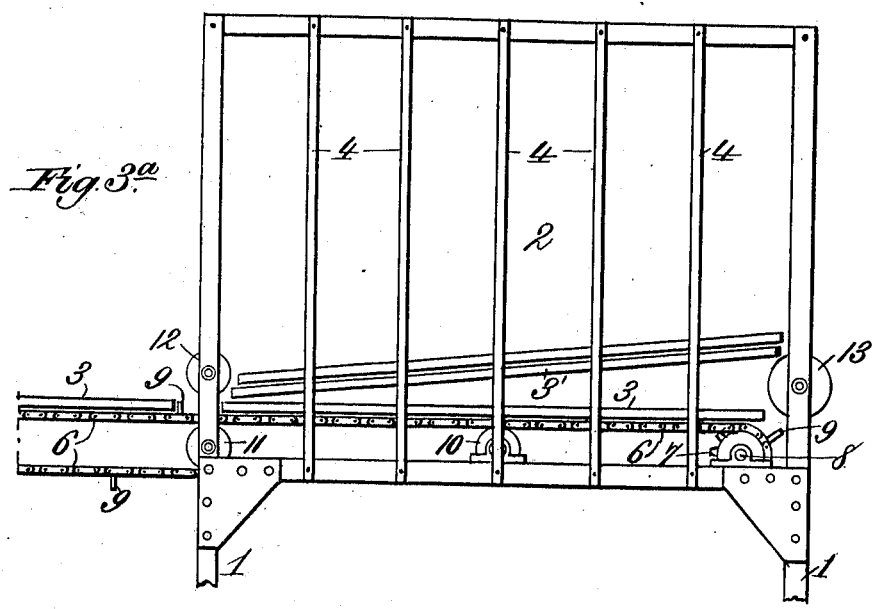
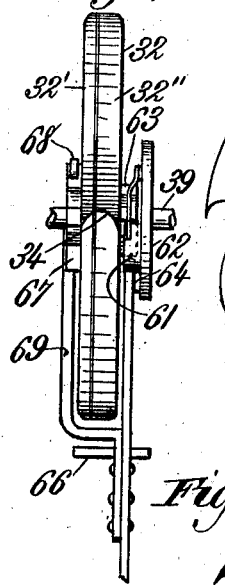
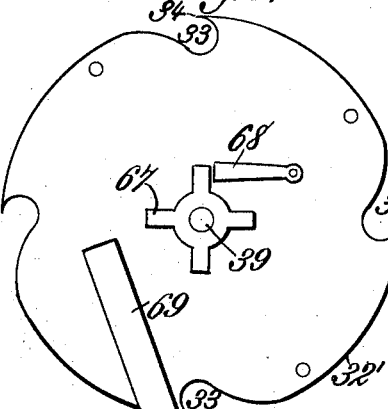
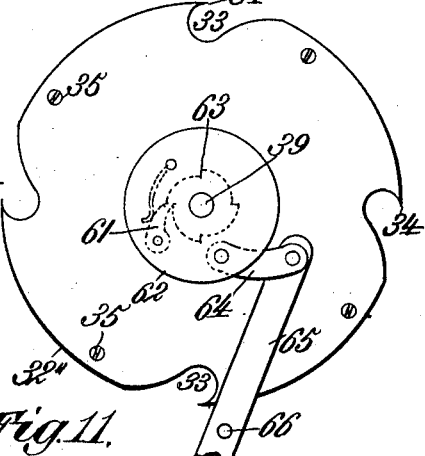
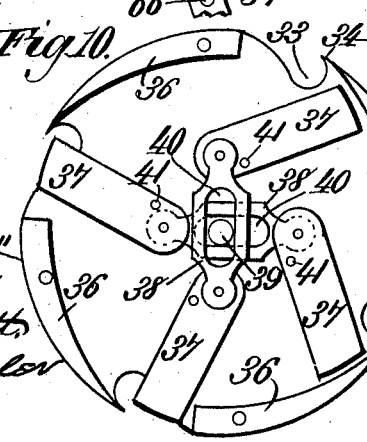
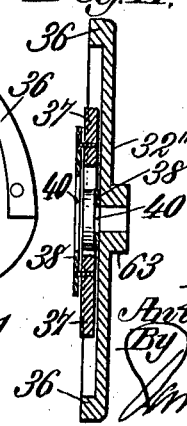
Witnesses.
Inventor.
Antonio Cotoli.
By James L. Norris Jr.
Atty.

A. COTOLI.
MACHINE FOR FORMING PLASTIC MATERIALS INTO TWISTED SHAPES.
APPLICATION FILED AUG. 16, 1910.
1,004,376.
Patented Sept. 26, 1911.
10 SHEETS—SHEET 7.
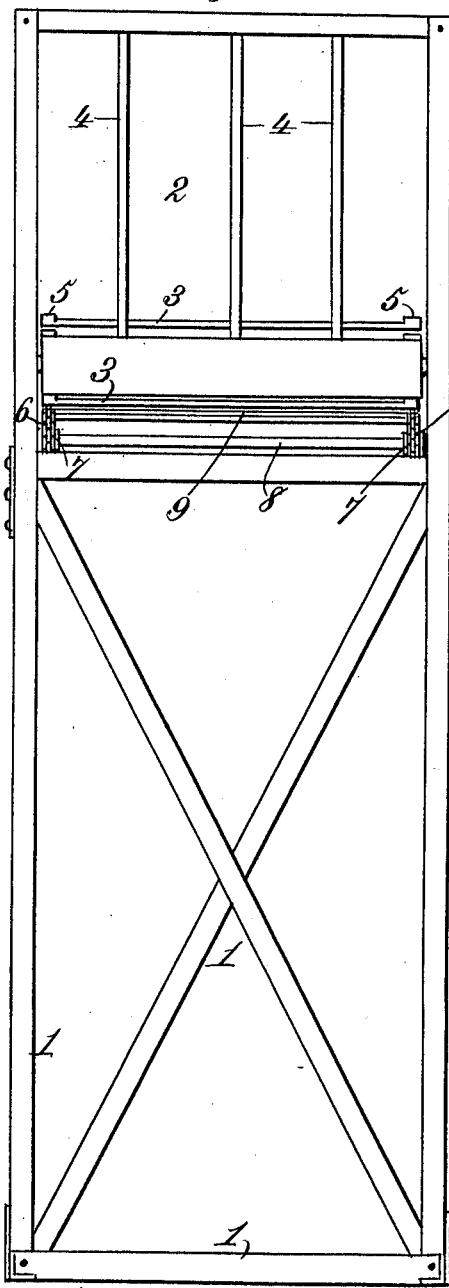
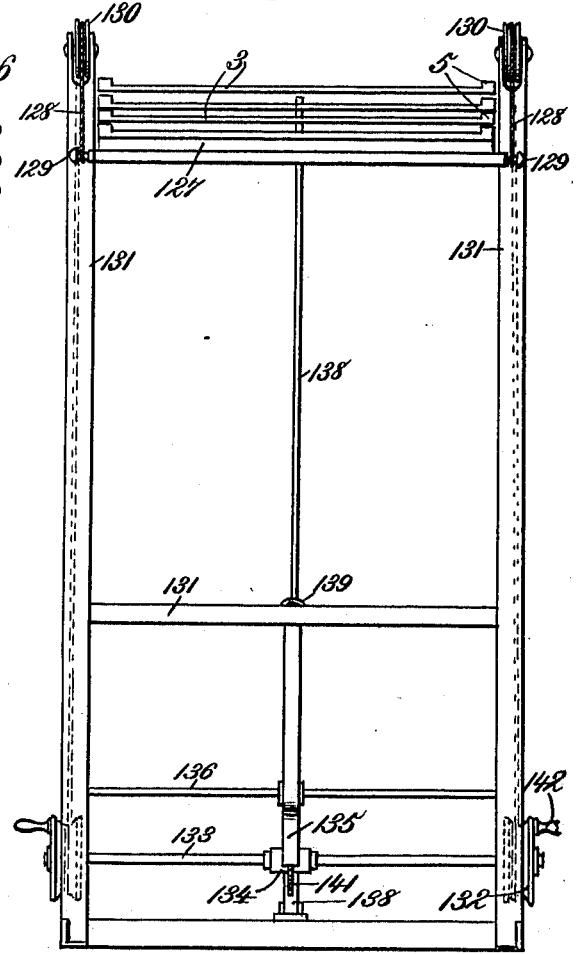
Witnesses.
Inventor:
Antonio Cotoli.

A. COTOLI.
MACHINE FOR FORMING PLASTIC MATERIALS INTO TWISTED SHAPES.
APPLICATION FILED AUG. 16, 1910.
1,004,376.
Patented Sept. 26, 1911.
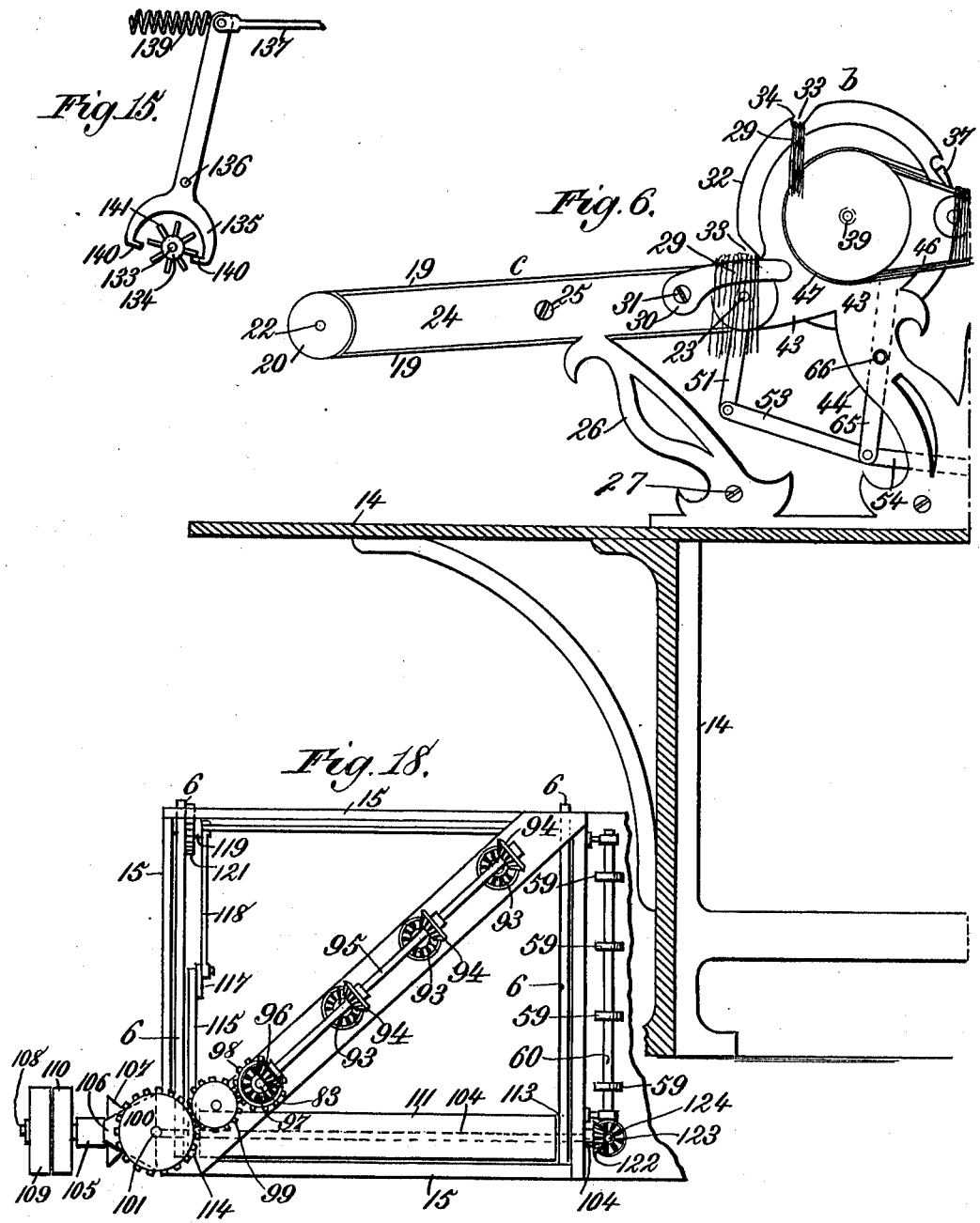

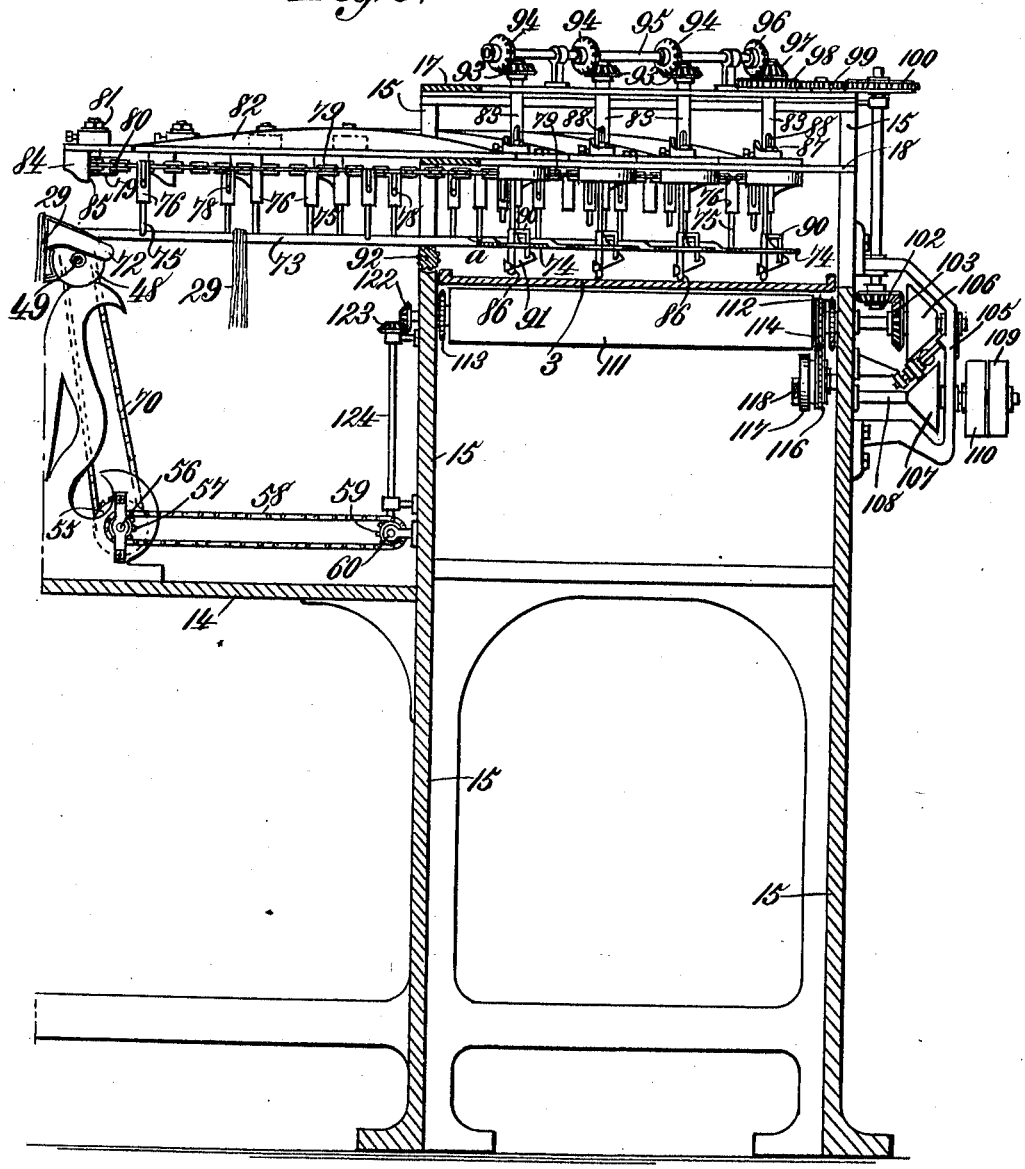

A. COTOLI.
MACHINE FOR FORMING PLASTIC MATERIALS INTO TWISTED SHAPES.
APPLICATION FILED AUG. 16, 1910.
1,004,376.
Patented Sept. 26, 1911.
10 SHEETS—SHEET 10.
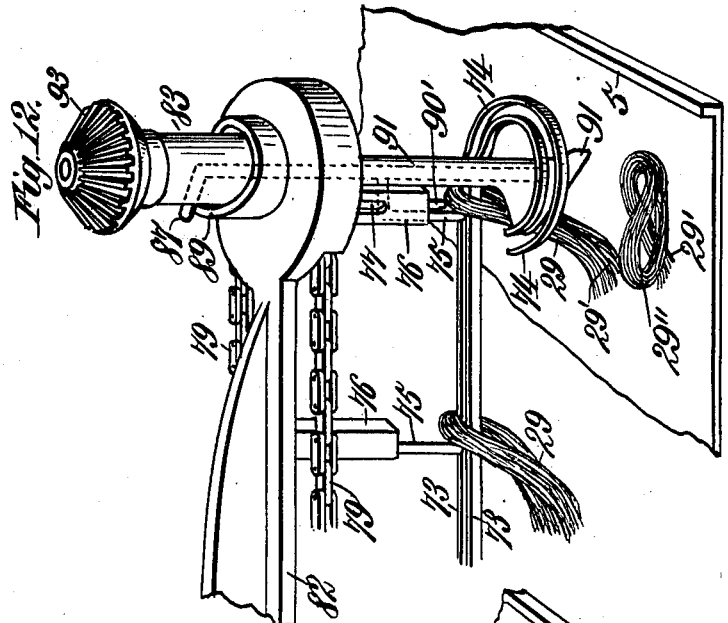
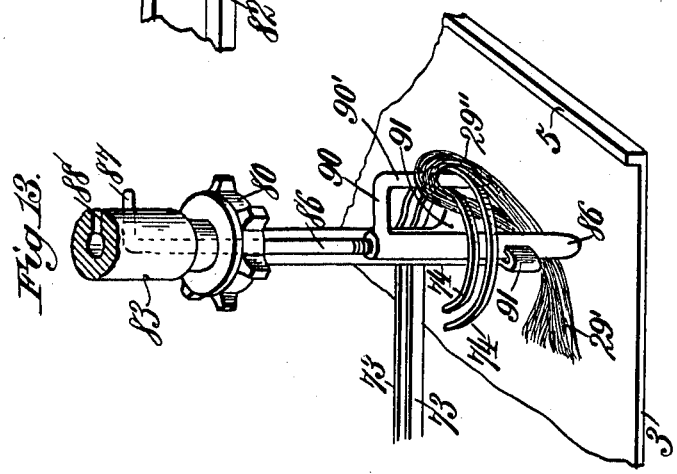
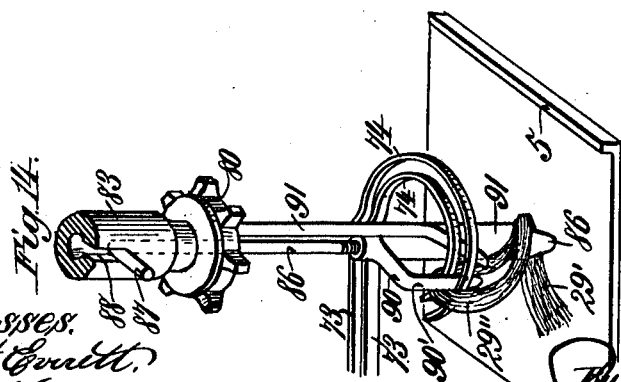

UNITED STATES PATENT OFFICE.

ANTONIO COTOLI, OF HABANA, CUBA.

MACHINE FOR FORMING PLASTIC MATERIALS INTO TWISTED SHAPES.

1,004,376.  Specification of Letters Patent.  Patented Sept. 26, 1911.

Application filed August 16, 1910. Serial No. 577,425.

*To all whom it may concern:*

Be it known that I, ANTONIO COTOLI, a subject of the King of Spain, residing at Habana, Cuba, have invented certain new and useful Improvements in Machines for Forming Plastic Materials into Twisted Shapes, of which the following is a specification.

My present invention relates to improvements in the manufacture of products from plastic materials, it relating especially to the manufacture of macaroni, vermicelli and similar food products from kneaded dough, and the object of this invention is to provide a machine for manufacturing such products which contains suitable mechanisms which automatically accomplish the necessary operations of conveying the material while in a plastic condition and of suitable consistency, dividing and distributing the material into separate bunches, twisting each bunch into the desired form, and assembling the twisted bunches upon platens which are successively brought into position to receive the finished product, all of the foregoing operations being performed automatically by the machine and without the necessity of the operator handling the material at any time during the manufacture of the products from the time the material is fed to the machine until the platens with the finished products thereon are removed from the machine, a considerable saving in time and economy in material being thereby effected in the manufacture of products of this class which have been impossible in those cases when these operations were performed by manual work.

To these and other ends, the invention consists in certain improvements, and combinations and arrangements of parts, all as will be hereinafter more fully described, the novel features being pointed out particularly in the claims at the end of the specification.

In the accompanying drawing: Figures 1 and 1ª represent parts of a plan view of a machine of the class described and constructed in accordance with the present invention; Figs. 2 and 2ª represent in parts a front elevation of the machine; Figs. 3 and 3ª show in parts a rear elevation of the machine; Fig. 4 shows the machine as viewed from one end; Fig. 5 illustrates the machine as viewed from the opposite end; Figs. 6 and 6ª represent in parts a section of the machine taken on the line 6ª—6 of Figs. 1 and 1ª. Fig. 7 is a detail view of the distributer, the same being viewed from the front; Figs. 8, 9 and 10 are detail side elevations of the parts composing the distributer; Fig. 11 represents a section on the line 11—11 of Fig. 10; Figs. 12, 13 and 14 are diagrammatic views showing the twister or forming mechanism in perspective and illustrating three different steps which are performed by the twister in giving the product the desired shape; Fig. 15 is a detail view of a part of the receiving mechanism for the platens containing the finished product; Fig. 16 is a diagrammatic view of the conveyer mechanism for conducting the platens; Fig. 17 is a detail view of the transmission or driving mechanism for the conveyer and distributing mechanism; and Fig. 18 is a detail plan view of the power transmitting mechanism for the twisters or forming devices.

Similar parts are designated by the same reference characters in the several views.

In the accompanying drawing, I have shown a machine which is capable of carrying out the objects of my invention. It will be understood, however, that the machine shown in the accompanying drawing is illustrated as an example of one embodiment of the invention, and that certain modifications and changes may be made in the detail construction and in the relative arrangement of the parts in order that the invention may be applied to the best advantage according to the circumstances of each particular case. In the present instance, the machine consists of three principal parts or mechanisms which coöperate with one another, one of these mechanisms serving to automatically convey empty platens to a position beneath the twisters, another of these mechanisms serving to distribute the material and to convey it to the twisting devices, the latter serving to shape the material into the desired forms, and the third mechanism serving to automatically collect the platens having the products deposited thereon.

The conveyer for the empty platens consists in the instance shown of a frame 1 which may be arranged horizontally and may have a substantially rectangular form, the upper portion of this frame forming a cage 2 which serves as a container or receptacle for the platens 3. The two sides and the rear of the cage 2 are provided with narrow vertical strips 4 which prevent displacement of the platens, the front of the cage, however, being open. Each platen 3 is provided on its opposite ends with upturned ribs 5 and when the platens are assembled in superposed relation within the cage 2, these ribs will be arranged one above another. The platens are removed from the cage by a horizontal movement, through the open front thereof and onto a conveyer, this conveyer in the present instance consisting of a pair of endless chains or bands 6 which operate beneath the pile of superposed platens contained in the cage 2. The chains at one end of the conveyer pass over a pair of sprocket wheels 7 fixed to a shaft 8, the shaft 8 being mounted in suitable bearings supported by the frame 1, and the chains at the opposite end of the conveyer are mounted in a manner that will be hereinafter described. The chains 6 of the conveyer are connected at suitable intervals with cross pieces 9, these cross pieces being spaced longitudinally of the conveyer distances equal substantially to the length of each platen, and these cross pieces are arranged to successively engage the rear edge of each platen and owing to the movement of the conveyer, the platens are thereby successively removed from the cage and are carried along on the conveyer. The chains of the conveyer are also preferably supported by rollers, the roller 10 being mounted substantially centrally with respect to the cage 2, while the roller 11 is mounted at the outlet of the cage 2, the axes of the rollers 10 and 11. being in a plane with the axis of the shaft 8. A roller 13 is mounted in the frame 1 and at the rear of the cage 2 and a similar roller 12 is mounted at the front of the cage and directly above the roller 11. The roller 12 is spaced above the roller 11 a distance substantially equal to the thickness of each platen in order that but one platen may pass from the cage at a time. The roller 13, however, preferably has a larger diameter than that of the roller 12, and the rollers 12 and 13 are spaced apart a distance somewhat less than the length of each platen. The object of this is to cause the platens to arrange themselves one above another and in an inclined position so that when one of the platens is being removed from the cage, the platen next above it will assume such a position that its forward end will rest against the roller 12 and directly above the lowermost platen which rests upon the conveyer, the rear edge of the platen above that resting on the conveyer being supported on the upper side of the roller 13.

The conveyer, distributer and shaping mechanism are arranged adjacent to and in coöperative relation with the platen-feeding mechanism just described. This mechanism embodies in the present instance a suitable standard or frame-work 14, the upper portion of which constitutes a table, and a frame 15 surmounts the standard and table 14. The chains 6 of the conveyer extend transversely through the frame 15 and are supported at this end by sprocket wheels 16 which are carried by a shaft 16', the latter being journaled in a suitable manner in the frame 15. The table 14 supports various mechanisms for distributing the material and forming it into the desired shapes. In the present instance, I provide a plurality of such mechanisms each in the form of a unit. The construction of each unit is substantially the same, and a detail description of one unit will be sufficient for all of them, and such mechanisms will be hereinafter described in detail. The mechanism for feeding plastic material or pastry to each unit of the machine consists of a pair of endless bands 19 which pass over a pair of grooved pulleys 20 and 21, and these pulleys are mounted on shafts 22 and 23 respectively. The shafts 22 and 23 are supported by a pair of vertical brackets 24, each pair of brackets being secured together by a screw 25. Each structure just described forms a conveyer $c$ for advancing the material for its respective unit. The brackets 24 may be supported in any suitable manner, they being supported in the present instance by brackets 26, these brackets being secured together by screws 27 and being supported on bases 28, these bases being fixed to the flat top of the table or frame 14 by screws or other suitable means. These brackets 26 form part of the journal bearing $d$ of each conveyer $c$ and distributer $b$. The macaroni, vermicelli or other material to be operated on, which is represented at 29 in Fig. 6, is suspended transversely upon each conveyer and in such a position that its ends depend evenly on both sides of the respective conveyer. By so suspending the material the latter will clear the pulleys and other parts of the machine, a guard 30, however, being preferably provided at each side of the pulleys 21 to prevent the material from catching upon these pulleys, these guards in the present instance being secured by the screws 31 to the respective brackets 24.

The distributing mechanism $b$ for each unit of the machine embodies a wheel 32 which is provided with notches 33 at suitable intervals in its periphery, these notches being in the form of hooks 34 which are adapted to coöperate with and receive the material and thereby transfer it from the respective conveyer $c$ to the corresponding distributer wheel 32. This wheel 32 is preferably composed of two plates 32' and 32" which are placed together flatwise and secured in such position by screws 35. In the present instance, a set of four notches 33 is formed on the distributer wheel and they are spaced equidistantly about its circumference. The plate 32″ in the present instance has a hollow interior to provide a space to contain a set of ejectors 37, and the inner wall of each notch 33 is open to form a passage in which the ejector 37 for each notch may operate in a manner to remove the material from such notch. For this purpose, the rim 36 of the plate 32″ is formed eccentrically on its inner circumference, as shown in Fig. 10. The ejectors 37 are pivotally connected at their inner ends to suitable actuating mechanism. In the present instance, this actuating mechanism embodies a pair of slotted links 38 which are arranged in right angular relation to each other and the ejectors 37 are pivotally connected in pairs to the ends of the respective slotted links 38. The slots 40 in the links 38 receive the central shaft 39 for the distributer wheel, the slotted formation of the links 38 permitting them to slide or shift in a direction transversely of said shaft, the ends of the slots, however, limiting such movement. The ejectors 37 are provided with laterally projecting pins 41 which are in immediate proximity to the respective ends of the slotted links 38, and these pins form in effect a driving connection between the plate 32″ and the slotted links in order that the latter will be caused to rotate at the same speed as the distributer wheel, these lateral pins 41 engaging in suitable recesses in the plate 32″ for this purpose. Owing to the construction just described, it will be obvious upon an inspection of Fig. 10 that after each ejector 37 has passed over a point perpendicularly above the shaft or axis 39, the weight of this particular ejector will cause it to fall forwardly, its end swinging into the respective notch 33 and thereby disengaging the material from the forwardly directed hook 34.

The distributer wheel 32 is mounted on the shaft 39 and this shaft in turn is supported by a bracket 44 which forms part of the bearing $d$. By mounting the distributer wheel in this manner, the periphery of the distributer wheel will be maintained at a constant distance from the discharge end of the respective conveyer $c$ and, consequently, the forwardly directed hooks 34 on the distributer wheel will transfer with certainty the material from the conveyer and to the distributing wheel as the latter rotates. The upper portions 43 of the brackets 44 which support the distributer wheel receive a pair of endless belts 46, and these belts coöperate with grooved pulleys 47 and 48, the pulley 47 being mounted loosely upon the distributer shaft 39 and the pulley 48 being mounted on a shaft 49 which is supported by a part of the bracket 43. The belts 46 it is to be understood are arranged at opposite sides of the distributer wheel and they are adapted to receive the material as it is discharged from the distributer wheel by the ejectors. A second pair of guards 72 may be provided toward the discharge end of the belts 46 so as to protect the material from the pulleys 48.

The distributer wheel is provided with suitable means for imparting an intermittent rotary movement thereto in order that each recess 33 may be successively positioned to receive the material from the conveyer $c$, and the conveyer $c$ also has means for imparting intermittent movement thereto and such movements of the conveyer take place during the intervals elapsing between the intermittent rotary movements of the distributer wheel in order that the material may be advanced to the distributer wheel by the conveyer and while the distributer wheel is at rest, certainty in the transfer of material from the conveyer to the distributer wheel being thereby insured. Any suitable means may be provided for imparting intermittent movement to the conveyer and the distributer wheel at appropriately timed intervals. In the present instance such mechanism consists of a pawl 50 (see Fig. 17) which is mounted on an arm 51 journaled loosely on the shaft 23, and this pawl coöperates with a ratchet wheel 52 fixed to one end of the shaft 23. The arm 51 is connected by a link 53 to a forked link 54, the latter being pivotally connected to a sprocket wheel 55 which is mounted on a shaft 56. This shaft 56 is also provided with a sprocket wheel 57 which is connected by means of an endless chain 58 with a similar sprocket wheel 59 mounted on a transverse shaft 60. The requisite intermittent rotary movement of the distributer wheel 32 is derived from a pawl 61 which is pivotally mounted on a disk 62 which disk is shown loosely mounted on the distributer shaft 39. A ratchet wheel 63 is fixed to the shaft 39 and the pawl 61 coöperates therewith. The disk 62 which carries the pawl 61 is pivotally connected to a link 64, the latter being pivotally attached to a lever 65 which lever is fulcrumed at 66 upon one of the bearings 44. The lower end of the lever 65 is pivotally connected to the forked link 54. The opposite end of the shaft 39 and that which carries the ratchet wheel 63 and disk 62 is provided with a toothed wheel 67, and a locking pawl 68 coöperates with this toothed wheel, the locking pawl being pivoted on the inner side of the bracket 43 and performs the function of preventing retrograde movement of the distributer wheel after each step in its rotation.

Movement is transmitted from the shaft 56 to the conveyer bands 46 by an endless chain 70 which coöperates with a sprocket wheel 71 which is fixed to the shaft 49 between the brackets 43, and such movement is a continuous one.

A pair of straight parallel guides 73 lead from the pulleys 48, these guides forming a channel and terminating in a convoluted or curved end 74, the curve, however, being an incomplete circle which leaves an opening. (See Figs. 12, 13 and 14.) The bunches of material 29 upon leaving the conveyer belts 46 traverse the guides 73 and are carried along these guides by means of followers 75, each follower in the present instance being carried by a depending arm 76 which has a lateral opening 77 through which a ring 78 on the follower 75 passes, and the necessary traveling movement is imparted to the followers by means of an endless chain 79 passing over sprocket wheels 80, one of these sprocket wheels being mounted on a vertical shaft 81 at a point adjacent to the conveyer 46 and this shaft 81 is preferably supported adjustably upon an arm 82, the arm 82 being supported by means of a bracket 18 from the frame 15, and the other sprocket wheel 80 is fixed to a vertical shaft 83 which shaft is supported by a diagonal bar 17. This bar 17 supports a number of shafts 83 corresponding to the number of twisters or units that are employed in the machine. This bearing arm 82 is arranged parallel to the rectilinear portion of the corresponding guides 73 but is offset laterally with respect thereto, as shown in plan in Fig. 1, in order that during the movement of the endless chain 79 the lower ends of the followers 75 will pass through the channel formed between the guides 73. This movement of the followers 75 serves to advance the bunches of material 29 and the followers are removed from the channel between the guides 73 after they reach a predetermined point in their movement by means of a segment 84 which has a depending flange 85 surrounding the sprocket wheel 80, this flange operating upon the part 76 of each follower in such a way as to cause the follower 75 to swing clear of the guides 73 as the follower leaves the rectilinear portion of the guides.

The twisting or forming device for each unit of the machine embodies a vertically arranged spindle 86 the upper end of which is bent laterally to form an operating arm 87, and this operating arm extends loosely through a vertical slot 88 which is formed in the shaft 83 of the sprocket wheel 80. The arm 87 which operates in the axial slot 88 in the shaft 83 imparts rotary movement to the spindle 86. Means is also provided for imparting vertical movement to the spindle, such means consisting in the present instance of a cam 89 which may be formed integrally with or fixed to the arm 82 and the diagonal support 18. The shape of this cam is such that when the arm 87 on the spindle occupies one position with respect to the cam, the lower end of the spindle which is in the form of a point will rest upon one of the platens 3 which has been previously placed beneath the twisting mechanism by the conveyer chains 6. The spindle 86 is also provided with a radial arm 90 which preferably has a rectangular bend therein, and the depending vertical portion 90' of this arm extends downwardly and operates in the annular channel formed between the curved guide sections 74. The spindle 86 is also partially surrounded by a guide 91, the upper end of this guide being fixed to the lower face of the sprocket wheel 80, and the lower end of this guide 91 is formed as a blade and this lower blade-shaped portion of the guide is arranged in rear of the arm 90.

During the travel of the material along the straight portions of the guides 73, the ends of the material which is in bunches are hanging equidistantly from opposite sides of the guides and are in a position to join one another preparatory to the twisting operation. In order to effect a joining of the ends of the bunches, a corrugated roller 92 is mounted transversely on the frame 15 and beneath the straight guides 73. The roller has at certain points sections of reversely arranged cone surfaces 92' which are located directly beneath the straight guides 73. The object of these cone-shaped surfaces is to unite the depending ends of each bunch before the bunch falls upon the platen. After the bunch of material has passed the roller 92, it meets the rib or flange 5 of the platen which is arranged to receive it. In this manner the joined ends of each bunch of material are arrested in their movement and while the bunch of material is being dragged, that portion of the bunch which hangs over the guides is engaged by the depending vertical portion 90' of the radial arm 90. In this manner the intermediate or middle portion of the bunch is carried around the curved guide sections 74 while the ends of the bunch remain upon the opposite side of the spindle 86, as shown in Fig. 13. Continued rotation of the spindle 86 causes the bunch of material to be substantially doubled upon itself, thereby forming a knot 29'', and the final rotation of the spindle 86 causes the doubled and knotted portion 29'' of the bunch to discharge from the end of the guide sections 74 and drop upon the ends 29' of the bunch, the material being thereby formed somewhat as a spiral. After the bunch of material has been discharged from the guide, the spindle 86 and the radial arm 90 forming part thereof are elevated by the cam 89 coöperating with the operating arm 87 of the spindle, the vertical portion 90' thereby clearing the straight portion 73 of the guide and then descending into the groove between the guides and in a position to engage and advance the next bunch of material, this operation being repeated automatically during the operation of the machine. In the present instance, the machine embodies four units and the twisting mechanisms of the several units are arranged in a diagonal line with respect to the receiving platen 3. This arrangement enables the twisting mechanisms to be arranged compactly and at each operation of the machine, four of the products are formed and they are arranged on the platen 3 in four separate rows.

The spindles for the several twisting mechanisms may be conveniently operated from a shaft 95 which is fitted with bevel gears 94, and one of these bevel gears coöperates with a similar bevel gear 93 upon the shaft 83 of each twisting mechanism. The common operating shaft 95 may be conveniently driven from a gear wheel 97 on one of the shafts 83, this gear wheel 97 coöperating with a gear wheel 96 on the shaft 95, and the gear 97 receives its motion from a spur gear 98, the latter coöperating with a driving gear 100 through the medium of an intermediate gear 99. The gear 100 is mounted on a vertical shaft 101 and this shaft 101 is operated by means of bevel gears 102 and 103, the latter being mounted on a shaft 104 which is journaled in a suitable frame 105, and the shaft 104 carries a friction cone 106 which is arranged in reverse relation to a friction cone 107, the latter being mounted on a power shaft 108 provided with suitable operating pulleys 109 and 110. The friction gears 106 and 107 form a variable speed transmission whereby the machine may operate at any desired speed, an idler wheel being mounted and adjustable between the opposed parallel surfaces of the cones.

The shaft 104 is provided with a roller 111 which is contained within the frame 15 over which the platens 3 are adapted to pass. A pair of sprocket wheels 112 and 113 are mounted on the shaft 104 and the ends of the conveyer chains 6 pass thereover. An additional sprocket wheel 114 is also mounted on the shaft 104 and is connected by a chain 115 to a sprocket wheel 116, the latter being arranged within the frame 15. A disk 117 is also arranged within the frame 15 and is connected by means of a link 118 to a pawl-actuating arm 119. This pawl-actuating arm is loosely pivoted on the shaft 16' and carries a pawl 120 which is arranged to coöperate with a ratchet wheel 121 which is fixed to the shaft 16'. The shaft 104 also transmits movement through bevel gears 122 and 123 to a vertical shaft 124 which is located on the exterior of the frame 15. The shaft 124 in turn transmits movement to the horizontal or transverse shaft 60 through bevel gears 125 and 126. This horizontal or transverse shaft 60 as previously described transmits movement to the conveyers c and the distributers b.

The present invention provides means for storing or assembling the platens in a pile or stack after they have been discharged from the conveyer chains 6. The mechanism provided for this purpose consists in the present instance of a vertically movable platform 127 which is suspended by a set of four cords 128, these cords being attached to the platform at 129 and the intermediate portions of the cords pass over pulleys 130 journaled in the upper portion of a suitable frame 131. The ends of the cords 128 are wound in pairs upon drums 132, these drums being fixed to a horizontal shaft 133 which is suitably journaled in the lower portion of the frame 131. The shaft 133 also carries an escapement wheel 134 which is provided with a set of radial projections 141. An escapement pawl 135 coöperates with the escapement wheel and is mounted on the pivot 136. The upper end of the escapement pawl is connected by a link 137 to a tripping lever 138, the latter being fulcrumed or pivoted at its lower end to the bottom of the frame 131, and its upper end is curved toward the shaft 16' and it is in a position to be engaged or tripped by the transverse members or cross pieces 9 connecting the conveyer chains, the escapement pawl being thereby operated in a direction to cause it to disengage from one tooth of the escapement wheel and to engage the next tooth thereof, the shaft 133 thereby receiving a retrograde motion that will allow the platform 127 to descend a distance sufficient to bring the upper side of the topmost platen thereon into a position to receive the next platen as it is discharged from the conveyer. The escapement pawl 135, however, is normally retained in locking position by means of a tension spring 139. A handle 142 may be provided for rewinding the drums 132 and thereby returning the platform to elevated position after a stack of platens has been assembled thereon.

The operation of the machine may be briefly described as follows: The empty platens resting one upon the other in the cage 2 are successively and automatically fed to the conveyer chains 6. The conveyer c is filled with the macaroni, vermicelli, spaghetti or other material which is placed upon the conveyer in such a way that its free ends are suspended equidistantly from opposite sides of the conveyer. Power from a suitable source is supplied to the machine through the driving pulley 110 and the machine is driven at the desired speed by suitable adjustment of the friction cones 106 and 107. The material is distributed in separate bunches by the distributing wheels 32 and as such bunches are ejected or discharged from the bunch former and distributing wheels, such material passes over the belts 46 and then upon the guides 73. The bunches are advanced along these guides and during such movement the suspended ends of each bunch are so operated upon by the roller 92 as to unite such ends. Further movement of the bunches causes them to be dragged over the receiving platen and at this point, the twisting spindles operate upon the bunches to form the material into the desired shapes.

I claim as my invention:

1. A machine for forming plastic materials into twisted or other desired shapes comprising a traveling conveyer adapted to engage intermediate portions of lengths of the material, guards arranged to receive the lengths of material from the conveyer and to support such material at laterally separated points, a device operative to remove the material from said guards and divide it into bunches, and means connected to receive such bunches from the dividing device and operative to twist the bunches into the desired shape.

2. A machine for forming plastic materials into twisted and other desired shapes comprising feeding means for advancing a supply of such material, a distributer wheel having means for rotating it intermittently and provided on its periphery with a set of notches to successively receive and divide the material into bunches, and means arranged to receive such bunches from the distributer wheel and operative to form them into the desired shape.

3. A machine for forming plastic materials into twisted shapes comprising feeding means for advancing a supply of such material, a rotary distributer wheel having notches in its periphery to successively receive and divide the material advanced by the feeding means into bunches and also having means for imparting an intermittent rotary movement thereto and having ejectors for removing the material from said notches, and means arranged to receive the bunches of material from the distributer wheel and operative to twist them into the desired shape.

4. A machine for forming plastic materials into twisted shapes embodying a conveyer adapted to engage intermediate portions of lengths of the material and to support the latter in doubled form, means for operating the conveyer intermittently to advance the material thereon step by step and in one direction, a bunch-forming device coöperative with the conveyer, means for imparting a step by step movement to the bunch-forming device at periods which alternate with the intermittent movements of the conveyer, and means arranged to receive the bunches of the material from the bunch-forming device and operative to form them into twisted shapes.

5. A machine for forming plastic materials into twisted shapes comprising an endless conveyer, a rotary distributer wheel having notches in its periphery to successively receive and divide the material from the conveyer into bunches, means for imparting alternate intermittent movement to the conveyer and distributer wheel, twisting mechanism for forming the bunches into twisted shapes, and means for automatically transferring the bunches from the distributer wheel to the twisting mechanism.

6. A machine for forming plastic materials into twisted shapes comprising a conveyer having means for operating it intermittently to advance a supply of material by a step by step movement in one direction, a bunch-forming device coöperative with the conveyer and having means for operating it intermittently and in one direction at periods which alternate with the movements of the conveyer, a second conveyer having means for operating it continuously to receive the bunches successively from the bunch-forming device, mechanism arranged to receive the bunches from the second conveyer and operative to form the bunches into twisted shapes, means for feeding platens successively to a position beneath the forming means, and means for receiving and automatically stacking said platens.

7. A machine for forming plastic materials into twisted forms comprising a conveyer for advancing a supply of such material, a rotary distributer wheel having notches in its periphery operative to successively receive and divide the material advanced by the conveyer into separate bunches, means for imparting alternate intermittent movements to the conveyer and distributer wheel, ejectors operative automatically to remove the bunches of material from the notches in the distributer wheel, guides arranged to receive the bunches of material successively from the distributer wheel, means for advancing the bunches of material along said guides, and twisting mechanism arranged to receive the bunches of material from said guides and operative automatically to form them into twisted shapes.

8. A machine for forming plastic materials into twisted forms comprising a conveyer for advancing a supply of the material, a distributer for receiving and dividing such material into separate bunches, guides arranged to receive the bunches of material from the distributer, means for advancing the bunches of material along said guides with the ends of the material depending therefrom, means to operate upon the depending ends of the material to unite them, and twisting mechanism arranged to receive the bunches of material from the guides and operative automatically to form them into twisted shapes.

9. A machine for forming plastic material into twisted shapes comprising a conveyer for advancing a supply of such material, twisting mechanism for forming the material into twisted shape, and a distributer arranged intermediate of the conveyer and twisting mechanism comprising a distributer wheel having its periphery provided with a series of notches, each notch presenting a hook-shaped point to receive material from the conveyer and divide it into a separate bunch, means for intermittently rotating said wheel to position said notches successively to receive the material from the conveyer, and a set of automatically operative ejectors coöperative with the respective notches and adapted to remove each bunch of material from the distributer wheel when the latter reaches a predetermined point in its rotation.

10. A machine for twisting paste or dough comprising a distributer for dividing the dough into separate bunches, and means for forming each bunch into a substantially spiral shape embodying a pair of curved guides forming a support for the intermediate portion of each bunch, a rotary spindle having a portion arranged to operate in a circular path between said guides and operative upon the intermediate portion of each bunch to form it substantially into a knot, the base of the spindle serving as an abutment for the ends of the bunch, and means for automatically lifting the spindle after each bunch has been formed into the desired shape.

11. A machine for forming plastic materials into twisted forms comprising a conveyer for advancing a continuous supply of such material, a rotary distributer wheel having a series of notches in its periphery, means for imparting an intermittent movement to said distributer wheel to successively position each notch to receive and divide a portion of the material on the conveyer into a separate bunch, means for automatically locking the distributer wheel successively in such positions, ejectors for automatically discharging bunches of material from the distributer wheel, twisting mechanism for forming the bunches of material successively into twisted shapes, and means to receive the bunches of material from the distributer wheel and to convey such bunches to the twisting mechanism.

12. A machine for twisting kneaded pastry comprising distributing means for dividing the pastry into separate bunches, straight guides forming a channel along which the bunches are adapted to advance after being released from the distributer, a set of followers having means for shifting them along said guides to advance the bunches of material at intervals thereon, curved guide sections forming continuations of the straight guides, a rotary spindle having a portion adapted to successively engage the bunches to advance them around the curved guide sections, means for automatically elevating said spindle to permit the vertical portion thereof to reënter the channel between the guide sections, and means for automatically removing the followers from the guides at a point adjacent to the curved guide sections.

13. A machine of the class described comprising twisting mechanism operative to form plastic materials into spiral form, a plate receptacle arranged at one side of the twisting mechanism, a conveyer mounted beneath the same and having means for successively removing the lowermost platens from such receptacle and for placing them beneath the twisting mechanism, a platform arranged at the opposite side of the twisting mechanism, means for suspending said platform including a set of cords attached to the platform, a shaft for winding said cords, said shaft having an escapement, and tripping means operative automatically by said conveyer for releasing the escapement and permitting a predetermined descent of the platform after the latter has received a platen.

14. In a machine of the class described, mechanism for supplying empty platens thereto, comprising a horizontally movable conveyer having cross-pieces spaced at intervals thereon, a receptacle arranged above the conveyer and adapted to contain the platens, a roller mounted in fixed position at one end of the receptacle to permit only a single platen to advance above the conveyer, and a second roller loosely mounted at the opposite end of the receptacle to support on its upper side the lowermost platen in an inclined position against the roller first mentioned.

In testimony whereof I have hereunto set my hand in presence of two subscribing witnesses.

ANTONIO COTOLI.

Witnesses:
RICARDO MORÉ,
HENRY P. STARRETT.

---

Copies of this patent may be obtained for five cents each, by addressing the "Commissioner of Patents, Washington, D. C."